US008760167B2

(12) United States Patent
Bloemenkamp

(10) Patent No.: US 8,760,167 B2
(45) Date of Patent: Jun. 24, 2014

(54) APPARATUS AND METHOD FOR BALANCING IMPEDANCE OF A RESISTIVITY MEASURING TOOL

(75) Inventor: Richard Bloemenkamp, Issy-les-Moulineaux (NL)

(73) Assignee: Schlumberger Technology Corporation, Sugar Land, TX (US)

( * ) Notice: Subject to any disclaimer, the term of this patent is extended or adjusted under 35 U.S.C. 154(b) by 598 days.

(21) Appl. No.: 13/008,394

(22) Filed: Jan. 18, 2011

(65) Prior Publication Data
US 2011/0140702 A1 Jun. 16, 2011

Related U.S. Application Data

(63) Continuation-in-part of application No. PCT/EP2009/004735, filed on Jun. 30, 2009.

(30) Foreign Application Priority Data

Jul. 22, 2008 (EP) .................................... 08160911

(51) Int. Cl.
*G01V 3/08* (2006.01)
(52) U.S. Cl.
USPC ............................. 324/355; 324/338; 324/354
(58) Field of Classification Search
CPC .............. G01V 3/08; G01V 3/20; G01V 3/24
USPC ......... 324/220–221, 244, 323–375, 658, 663; 702/6–11, 55; 73/152.01–152.03, 73/152.19, 152.43–152.46
See application file for complete search history.

(56) References Cited

U.S. PATENT DOCUMENTS

| 3,973,181 | A | 8/1976 | Calvert |
| 4,594,552 | A | 6/1986 | Grimaldi |
| 6,351,129 | B1 * | 2/2002 | Gounot .......................... 324/368 |
| 6,603,314 | B1 * | 8/2003 | Kostelnicek et al. .......... 324/368 |
| 6,809,521 | B2 * | 10/2004 | Tabarovsky et al. ........... 324/374 |
| 7,064,551 | B2 * | 6/2006 | Dubourg et al. ............... 324/368 |
| 7,242,194 | B2 | 7/2007 | Hayman et al. |
| 7,256,582 | B2 | 8/2007 | Gorek et al. |
| 2007/0103159 | A1 * | 5/2007 | Forgang et al. ................ 324/338 |
| 2008/0068025 | A1 * | 3/2008 | Gold et al. ..................... 324/367 |

FOREIGN PATENT DOCUMENTS

| EP | 1947479 | 1/2011 |
| EP | 2148223 | 1/2012 |
| GB | 2401185 | 11/2004 |
| WO | 2008077477 | 3/2008 |

* cited by examiner

Primary Examiner — Arleen M Vazquez
Assistant Examiner — Robert Alejnikov, Jr.
(74) Attorney, Agent, or Firm — Stephanie Chi; Jody DeStefanis

(57) ABSTRACT

Techniques related to making resistivity measurements of an underground formation surrounding a borehole involve using a tool having a pad mounted on the body of the tool. The pad has a current injector electrode and a current return electrode mounted on the pad face and arranged such that the current injector and return electrodes are electrically isolated from each other when in use. Two impedance ratios are determined. The first is a ratio of the electrical impedance between the current injector electrode and the tool body, and the electrical impedance between the current return electrode and the tool body. The second is a ratio of the electrical impedance between the current injector electrode and the formation, and the electrical impedance between the current return electrode and the formation. The tool is arranged such that the two impedance ratios differ by 25% or less of the larger impedance ratio.

20 Claims, 6 Drawing Sheets

APPARATUS AND METHOD FOR BALANCING IMPEDANCE OF A RESISTIVITY MEASURING TOOL

CROSS REFERENCE TO RELATED APPLICATIONS

This application is a continuation-in-part of PCT/EP2009/004735 filed on Jun. 30, 2009.

FIELD

This disclosure relates to apparatuses and methods for making resistivity measurement of an underground formation, in particularly for balancing impedance in borehole resistivity imaging.

BACKGROUND

In the exploration and production of hydrocarbons, it is desirable that the properties of the formation, such as resistivity surrounding a wellbore, be detected. Micro-resistivity tools measure borehole surface resistivity, and these resistivity measurements may then be used to obtain a borehole wall image.

When measuring the micro-resistivity of a low-resistivity formation surrounding a borehole in a non-conductive mud, the tool mandrel, the non-conductive mud and the low-resistivity formation together form a coaxial waveguide, particularly for frequencies above about 100 kHz. The impedance that may be measured between the mandrel and the formation at the position where a measurement system is located can then be unstable. This is because any contact or partial contact between the mandrel and the formation that may occur up to tens of meters away from the measurement system can have an effect on this impedance. These variations of impedance will normally have an effect on electromagnetic measurements, particularly those above about 100 kHz, if no precautions are taken.

EP Patent Application 06292050.9 attempts to provide one solution to this problem by preventing the waveguide being excited while at the same time preventing reflections from having an effect by separating the waveguide from the measurement system by electrically decoupling the measurement system from the tool mandrel.

SUMMARY

It is an object of this disclosure to provide apparatuses and methods to address the effect that borehole guided waves may have on a measurement system.

A first aspect of this disclosure relates to an apparatus for making resistivity measurements of an underground formation surrounding a borehole, comprising:
- a conductive tool body;
- a pad having a conductive back face and an insulating front face with conductive electrodes located there between;
- at least one current injector electrode and at least one current return electrode mounted on a face of the pad so as to be positionable in use, adjacent the wall of the borehole, the injector and return electrodes being electrically isolated from each other;

wherein the tool body, pad, and current injector and return electrodes are arranged such that in use:
a) the ratio of the electric impedance between the current injector electrode and the tool body and the electrical impedance between the current return electrode and the tool body on one hand, and
(b) the ratio of the electrical impedance between the current injector electrode and the formation and the electrical impedance between the current return electrode and the formation on the other hand, are substantially equal or sufficiently match with each other such that substantially no potential difference or only notable potential difference below an acceptable level between the tool body and the formation is created during the measurement.

The apparatus may be arranged so that the electrical impedance between the current injector electrode and the pad has a predetermined value, and/or the apparatus may also be arranged so that the electrical impedance between the current return electrode and the pad has another predetermined value.

The pad may be mounted on the tool body by mounting means that provides a conductive path between the pad and the tool body. The mounting means may comprise an arm. The pad may comprise a conductive back face that is made of a metallic material and electrically connected to the tool body.

In some embodiments, the pad may comprise two current return electrodes, with the current injector electrode located therebetween.

The current return electrode(s) may be configured to wrap around part of the current injector electrode so as to increase the capacitance between the tool body and the current return electrode(s), and decrease the capacitance between the toot body and the current injector electrode.

The current return electrode(s) may be configured such that a significant part (e.g., more than about 30 cm$^2$) of the electrode(s) is located between a part of the current injector electrode and the back face of the pad so as to increase the capacitance between the tool body and the current return electrode(s), and decrease the capacitance between the tool body and the current injector electrode.

The apparatus can further comprise electrical components connected to the tool body, pad and current injector and return electrodes that modify the electrical behaviour so as to provide the required impedance ratios.

The electrical components may be tuneable such that the electrical response of one or more parts of the apparatus can be adjusted to meet operational requirements. Preferably the tuneable components may be dynamically adjusted by an active system.

The current injector electrode and/or the current return electrode(s) may comprise a spatially distributed array of measurement electrodes. These measurement electrodes may be used for creating measurements which are processed to create a borehole image.

A second aspect of this disclosure relates to a method that utilizes the apparatus.

BRIEF DESCRIPTION OF DRAWINGS

Like reference symbols in the various drawings indicate like elements.

DETAILED DESCRIPTION

During resistivity measurement of a low-resistivity formation surrounding a borehole in a non-conductive fluid, a waveguide (coaxial transmission line) can be formed by the tool mandrel, the non-conductive borehole fluid and the low-resistivity formation. When measurement systems are operating above about 100 kHz, the measurement systems will inject a wave in the borehole annulus which can lead to a reflected wave. This reflected wave may perturb the measurements that the measurements systems are making. For frequencies that are not too high, the waveguide may allow for propagation of transverse electromagnetic (TEM) waves and not allow for other modes of propagation.

The impedance between the mandrel and the formation at the position where the measurements are to be taken depends on the characteristic impedance, the length and the termination load of the transmission line.

All three quantities (characteristic impedance, line length and termination load) can change over a large range and therefore impedance may vary significantly as the tool moves. In addition, these quantities may not be easy to determine, especially the impedance between the tool mandrel and the formation at the touch point. The measurement systems and techniques described herein can prevent the excitation of borehole waves by balancing the measurement systems so that substantially no potential difference or only notable potential difference below an acceptable level is created between the tool mandrel and the formation at the position where the measurement systems are deployed.

Figure 1:
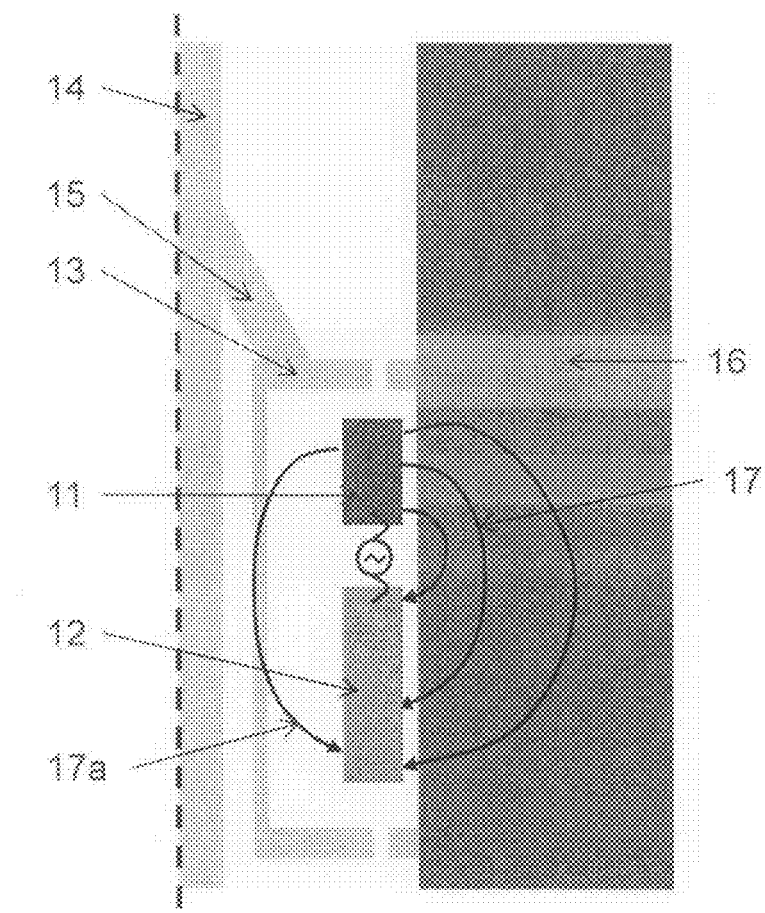
FIG. 1 shows a schematic diagram of an example of a measurement system according to the present disclosure.

With reference to FIG. 1, an exemplary measurement system includes a current injector electrode 11, a current return electrode 12 and a set of measurement electrodes (not shown) located on a pad 13, attached to a conductive tool body 14 which is centred in the borehole over several meters, e.g., a tool mandrel or a drill pipe. The current injector and return electrodes 11, 12 and tool body 14 are electrically mutually insulated from one another. An arm 15 connects the pad 13 of the measurement system to the tool mandrel 14 to position the measurement system against the formation 16 where the measurements are to be taken. The arm 15 provides a conductive path between the pad 13 and the tool body 14.

The measurement system can be part of a tool that is measuring in an existing borehole, e.g., wireline or statically installed, or is measuring in a borehole being created, i.e., an LWD (logging while drilling)/MWD (measurement while drilling) tool. Some examples of an LWD/MWD tool are described in U.S. Pat. No. 7,242,194 and U.S. Pat. No. 7,256,582.

The measurement system can be placed entirely or partly on a pad, a mandrel, a stabilizer blade, a rotary sleeve, a centralizer, a drill pipe or other mechanical systems which can position the measurement system in a borehole. Examples of such tools that the measurement system may be part of include (guarded) 2, 3, and 4 terminal measurement tools.

When the measurement system is pushed against the borehole wall, the current injector electrode 11 can inject a measurement current 17 into the formation 16. The current 17 can then return to the current return electrode 12 on the pad 13. In addition to the measurement current 17, there may also be a leakage current 17a going from the current injector electrode 11 to the current return electrode 12 via the metallic back of the pad 13. The metallic body is the part of the pad that has a good electric contact to the arm 15 and the tool mandrel 14 at the frequency or frequencies that the measurement system is working at.

As the insulation between each of the elements of the measurement system may not be perfect, the impedance between the current injector electrode 11 and the conductive tool body 14 and the impedance between the current return electrode 12 and the tool body 14 can be tuned so that substantially no potential difference or only notable potential difference below an acceptable level is created between the tool body 14 and the formation 16. With substantially no potential difference or notable potential difference that is below an acceptable level between the tool body 14 and the formation 14, substantially no or less borehole waves may be generated. The tuning can be fixed or dynamically changing by a regulation system. The regulation system may allow the electrical behaviour of the various impedances between the tool body 14, pad 13 and current injector and return electrodes 11, 12 to be altered as different borehole conditions are encountered, so as to maintain the potential difference between the tool body 14 and the formation 16 at substantially zero or at an acceptable level.

The measurement system is designed so that the system does not induce an unacceptable level of potential difference between the mandrel 14 and the formation 16 at the position of the measurement system, and as such does not excite electromagnetic waves in the borehole. The measurement system should not be affected by variations in the characteristic impedance, the length, and the termination load of the transmission line if the measurement system is designed such that substantially no potential difference or only notable potential difference below an acceptable level is created between the tool mandrel 14 and the formation 16 at the position of the system. This can be done by arranging the tool body 14, pad 13, and current injector and current return electrodes of the measurement system so that in use (a) the ratio of the electrical impedance between the current injector electrode 11 and the tool body 14 (ZLI) and the electrical impedance between the current return electrode 12 and the tool body 14 (ZLR) is substantially equal to or sufficiently matches with (b) the ratio of the electrical impedance between the current injector electrode 11 and the formation 14 (ZMI) and the electrical impedance between the current return electrode 12 and the formation 16 (ZMR). For example, in use the two impedance ratios (ZLI/ZLR, ZMI/ZMR) do not differ by more than a predetermined percentage of the larger of the two ratios. In some cases, the two impedance ratios differ by about 25% or less. In some cases, the two impedance ratios differ by about 10% or less. In some cases, the two impedance ratios differ by about 5% or less. In some cases, the two impedance ratios differ by about 1% or less. This leads to a measurement system that generates substantially no potential difference or only notable potential difference below an acceptable level between the tool body and the formation. For example, any potential difference generated between the tool body and the formation is less than a predetermined fraction of the potential difference between the current injector electrode and the current return electrode. In some cases, the potential difference between the tool body and the formation is about 25% or less than the potential difference between the current injector and return electrodes. In some cases, the potential difference between the tool body and the formation is about 10% or less than the potential difference between the current injector and return electrodes. In some cases, the potential difference between the tool body and the formation is about 5% or less than the potential difference between the current injector and return electrodes. In some cases, the potential difference between the tool body and the formation is about 1% or less than the potential difference between the current injector and return electrodes. In those situations, the measurement system does not inject any significant or unacceptable levels of electromagnetic waves into the waveguide independent of the characteristics of the waveguide.

This disclosure is applicable to systems where:
the electrical/electromagnetic measurement systems have frequencies above about 100 kHz or temporal signals with spectral components above about 100 kHz;
in a borehole filled with mud that at the measurement frequency is significantly more resistive than the formation; and
where the measurement system excites unwanted EM waves in the borehole and is affected by the reflecting borehole waves.

Figure 2:
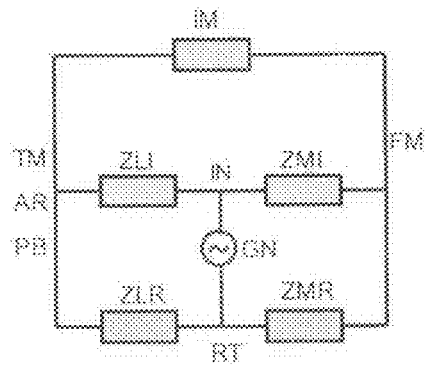
FIG. 2 shows a diagram of an electrical equivalent of FIG. 1.

FIG. 2 shows an equivalent circuit scheme for the measurement system shown in FIG. 1. To balance the measurement system, an impedance is chosen such that the impedances ZLI and ZLR are such that there is no or a very small voltage across ZIM, which is the electric complex impedance measured between the tool mandrel 14, TM, and the formation 16, FM, at the point of measurement, i.e., no or little potential difference between the back face of the pad, PB, and the formation 16, FM. The measurement system balances the impedances by making ZLI and ZLR as big as possible while still respecting the equation:

$$ZLI/ZLR \approx ZMI/ZMR$$

where ZLI is the complex impedance between the current injector electrode, IN, and the pad back face, PB;
ZLR is the complex impedance between the current return electrode, RT, and the pad back face, PB;
ZMI is the complex impedance between the current injector electrode, IN, and the formation, FM; and
ZMR is the complex impedance between the current return electrode, RT, and the formation, FM.

If this equation is sufficiently respected then the voltage across ZIM can be close to zero or maintained at an acceptable level. Maximising ZLI and ZLR decreases the coupling to the coaxial transmission line in the case where the equation is not adequately respected.

ZMI is the complex impedance of the leaky mud capacitance between IN and FM. This impedance therefore varies with the standoff between IN and FM. The capacitance between IN and FM can to first order be approximated by a parallel plate capacitance. The surface area of the part of the current injector electrode IN that is facing the borehole wall is the size of the plate. The standoff is the distance between the plates, and the mud permittivity is the dielectric permittivity of the material between the plates. For a better approximation, it is desirable to include fringing capacitance between other parts of the current injector electrode IN and the formation FM. Models or computer simulations can be used to obtain this capacitance for various designs, mud and formations. As an example, the injector surface area may be about 1600 mm$^2$, the standoff may be about 3 mm and the mud dielectric permittivity may be about 5 $\in_0$, leading to an injector-formation-capacitance of about 24 pF.

ZMR is the complex impedance of the leaky mud capacitance between RT and FM, therefore this impedance may vary with the standoff between RT and FM. The capacitance between RT and FM can to first order be approximated by a parallel plate capacitance. The surface area of the part of the current return electrode(s) RT that is facing the borehole wall is the size of the plate. The standoff is the distance between the plates, and the mud permittivity is the dielectric permittivity of the material between the plates. As an example, the return surface area may be about 8000 mm$^2$, the standoff may be about 3 mm and the mud dielectric permittivity may be about 5 $\in_0$, leading to a return-formation-capacitance of about 120 pF.

The impedances ZLI and ZLR can be determined during the design of the tool, but due to spatial restrictions at least one of the two impedances can have a large capacitive component of the order of about several tens or hundreds of pico-Farads. By altering the design of the tool or by adding one or more electric components, it is possible to balance the two capacitances.

If the standoff IN to FM and RT to FM vary in the same way, then the ratio ZMI/ZMR may not change and one can use a fixed ratio ZLI/ZLR. However, if with standoff they do not vary in the same way, one may rely on ZLI or ZLR being sufficiently high to prevent the waveguide effect or one may apply some actively regulated balancing technique(s) to obtain the correct ratio. Likewise, if the mud permittivity changes, ZMI/ZMR may not change and one may use a fixed ratio of ZLI/ZLR.

Figure 3:
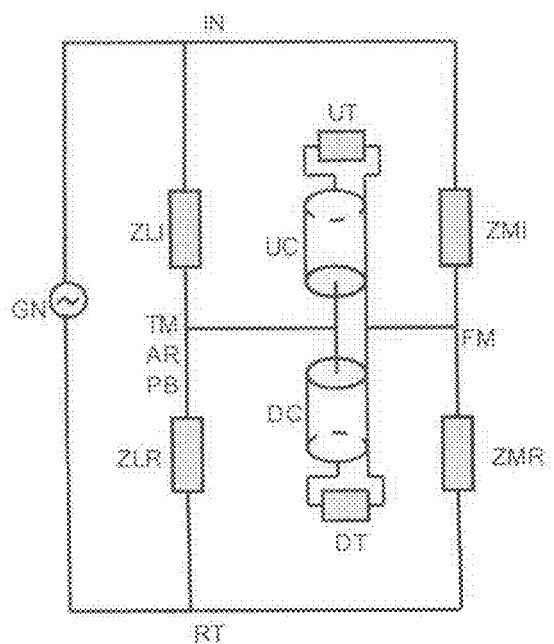
FIG. 3 shows a diagram for another electrical equivalent of FIG. 1.

FIG. 3 shows an alternative view of the equivalent circuit scheme of FIG. 1. FIG. 3 shows that by properly choosing the ratio ZLI/ZLR, it is possible to make the potential difference between TM and FM substantially equal to zero or at an acceptable level. FIG. 3 is equivalent to FIG. 2 where the ZIM has been replaced by the two borehole coaxial transmission lines, where UC is the upward coaxial line formed by TM, borehole annulus and FM; DC is the downward coaxial line formed by TM, borehole annulus and FM; UT is the upward coaxial line termination, e.g., due to TM touching FM or because it is open-ended; and DT is the downward coaxial line termination, e.g., due to TM touching FM or because it is open-ended. In some cases, the downward coaxial line may be negligible, e.g., in some configurations where the tool is the last tool in a tool string.

Figure 4:
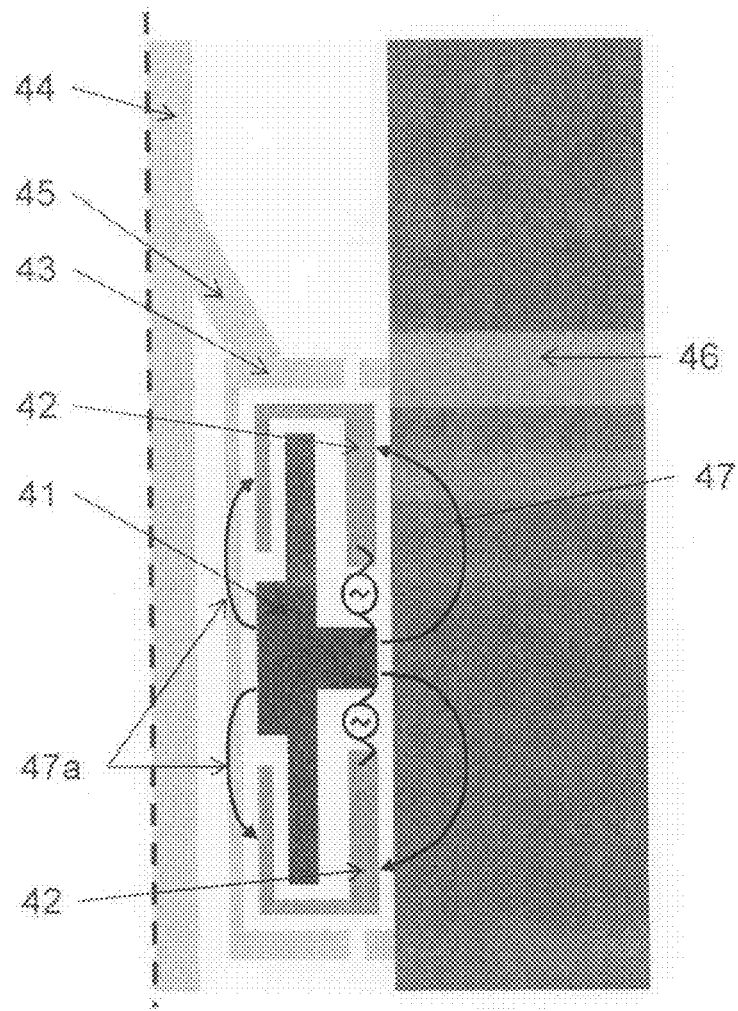
FIG. 4 shows a schematic diagram of another example of a measurement system according to the present disclosure.

FIG. 4 shows another example of a measurement system according to the present disclosure. The measurement system includes a pad 43 with one current injector electrode 41 and two current return electrodes 42 attached to a tool mandrel 44 via an arm 45. The current return electrodes 42 may have an extension folded around the current injector electrode 41. This increases the capacitance between the back plate of the pad 43 and the current return electrode 42 while at the same time decreasing the capacitance between the pad back plate and the current injector electrode 41. Therefore ZLI will increase and ZLR will decrease. The impedance ZLI can be measured with an impedance meter with the terminals connected to the pad back plate and the current injector electrode; while the impedance ZLR can be measured with an impedance meter with the terminals connected to the pad back plate and one of the two current return electrodes. By properly choosing the size of the extension folded around the current injector electrode, the ratio ZLI/ZLR can be fixed to a predetermined value.

When the measurement system is pushed against the borehole wall, the current injector electrode 41 can inject a measurement current 47 into the formation 46. The current 47 can then return to the current return electrode 42 on the pad 43. In addition to the measurement current 47, there may also be a leakage current 47a going from the current injector electrode 41 to the current return electrode 42 via the metallic body of the pad 43.

Figure 5:
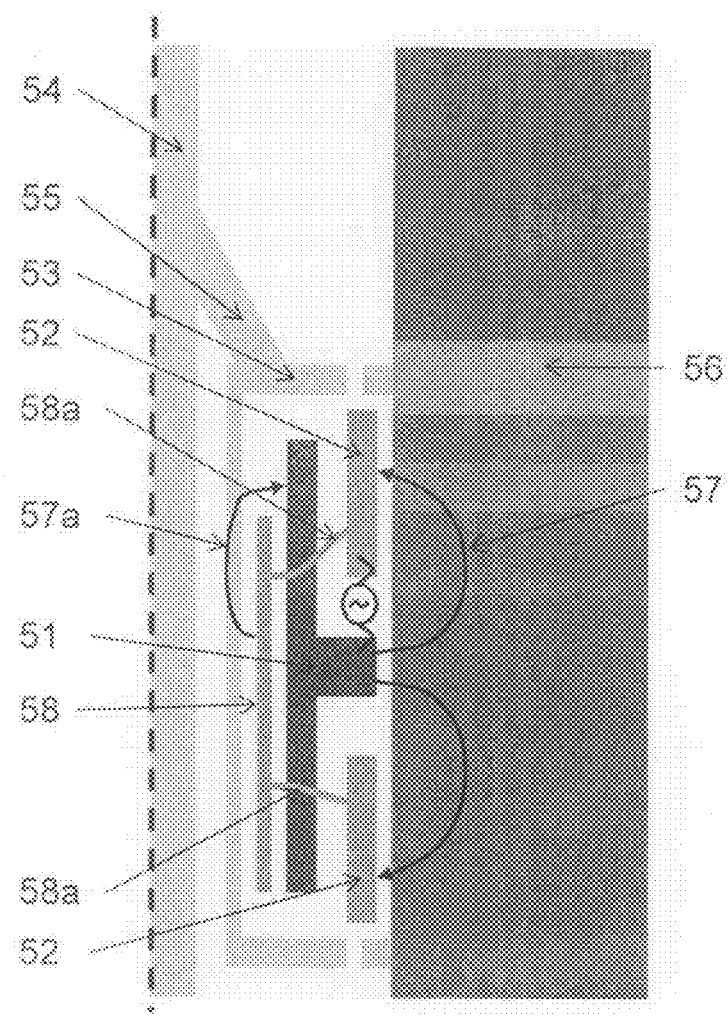
FIG. 5 shows a schematic diagram of a further example of a measurement system according to the present disclosure.

FIG. 5 shows a further example of a measurement system according to the present disclosure. The measurement system includes a pad 53 with one current injector electrode 51 and two current return electrodes 52 attached to a tool mandrel 54 via an arm 55. The current return electrodes 52 are connected via standard electrical connections elements 58a such as pins, wires, and the like to a conductive sheet 58 that is positioned between the current injector electrode and the conductive back plate of the pad 53. This increases the capacitance between the back plate of the pad 53 and the current return electrodes 52, while at the same time decreasing the capacitance between the pad back plate and the current injector electrode 51. The impedance ZLI can be measured with an impedance meter with the terminals connected to the pad back plate and the current injector electrode; while the impedance ZLR can be measured with an impedance meter with the terminals connected to the pad back plate and one of the two current return electrodes. By properly choosing the size of the conductive sheet 58, the ratio ZLI/ZLR can be fixed to a predetermined value.

When the measurement system is pushed against the borehole wall, the current injector electrode 51 can inject a measurement current 57 into the formation 56. The current 57 can then return to the current return electrode 52 on the pad 53. In addition to the measurement current 57, there may also be a leakage current 57a going from the current injector electrode 51 to the current return electrode 52 via the metallic back of the pad 53.

Other systems to obtain balancing of impedance can include the use of active, tuneable discrete electrical components such as tuneable capacitors, inductors and/or resistors or complete active systems. These electrical components can be connected to the tool body, pad and/or the current injector and return electrode(s) to modify their electrical behaviour so as to provide the desired impedance ratios.

Figure 6:
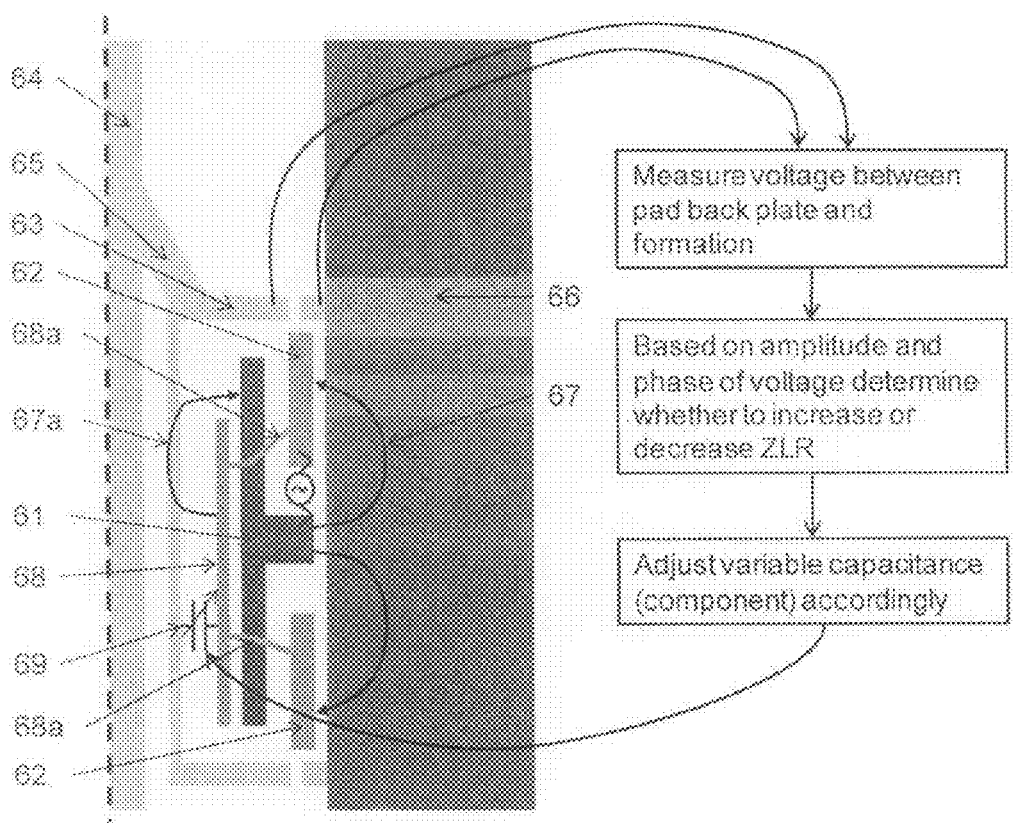
FIG. 6 shows a schematic diagram of a yet further example of a measurement system according to the present disclosure.

FIG. 6 shows yet another example of a measurement system according to the present disclosure. In this example, the measurement system includes a pad 63 attached to a tool mandrel 64 via an arm 65. The pad 63 includes one current injector electrode 61 and two return electrodes 62, and a measurement current 67 may be injected into the formation 66 by the current injector electrode 61 and returned to the two return electrodes 62. The measurement system further uses a tuneable variable capacitor component 69. The potential difference between the formation 66 and the back plate of a pad 63 is measured. This potential difference can for example be measured with a voltmeter with one terminal connected to the pad back plate and the other terminal connected to a conductor which is in contact with the formation 66. A conductive wear plate 68 that is in contact with the formation can be an example for such a conductor. The amplitude of the potential difference is a measure of unbalance of the system. One can adjust the capacitance of the variable capacitor 69 so that this amplitude decreases to an acceptable level for which the tool can be considered balanced. For example, the phase or polarity can determine whether the ratio ZLI/ZLR may be too high or too low. Based on amplitude and phase (polarity), the variable capacitance can be adjusted to change the impedance ratio until the amplitude is sufficiently low; for example such that the amplitude is less than about 10% of the voltage between the current injector electrode 61 and the current return electrodes 62.

Figure 7:
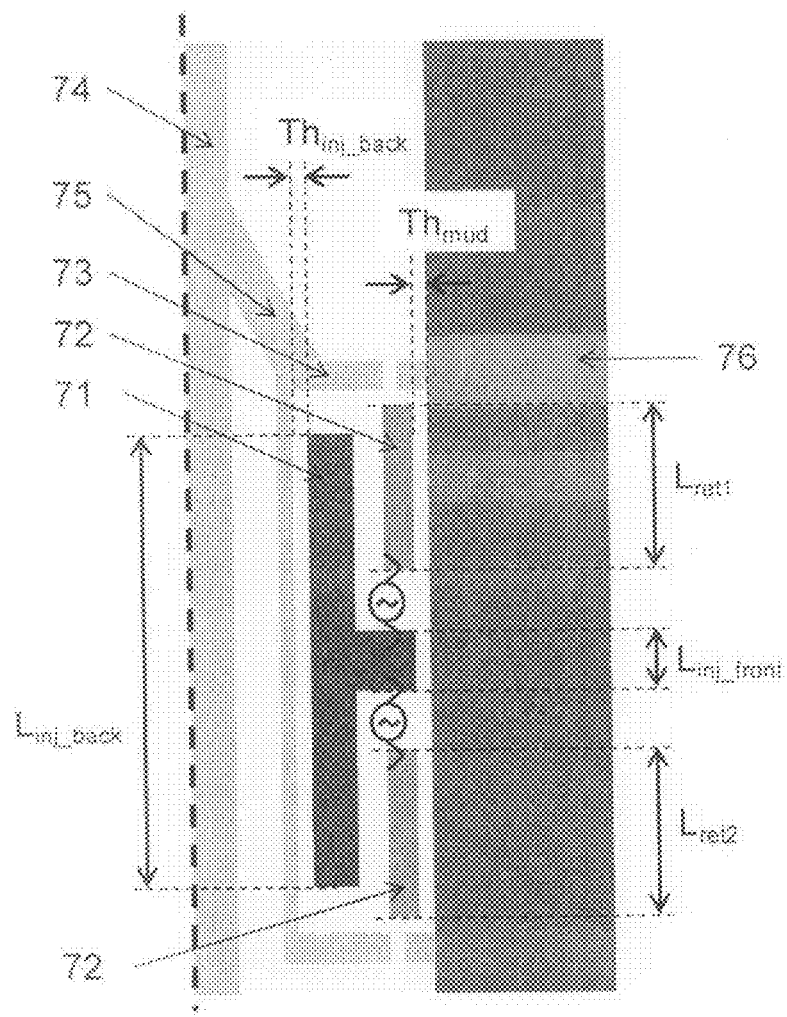
FIG. 7 shows a schematic diagram of a comparative example of a measurement system where the balancing condition may not be met.

FIG. 7 shows a comparative measurement system where a balancing condition may not be met. Compared to the measurement systems shown in FIGS. 1 and 4-6, this comparative measurement system includes a current injector electrode 71 that has an increased size so as to provide enough space to house the electronics necessary for the measurements. $L_{inj\_back}$ can for example be of the order of about 15 cm. At the same time, the insulation thickness ($Th_{inj\_back}$) has been decreased such that a pad 73 becomes thin enough (for example, about 40 mm) to be mounted (e.g., by an arm 75) on a tool body 74 that can pass a sufficiently small borehole. Thicker pads result in a tool that has a large diameter even with the pads closed. A tool with thick pads may therefore not be suitable for use in a small diameter borehole (for example, about 6 inch). $Th_{inj\_back}$ can for example be of the order of about 5 mm. As a result, even if the relative dielectric permittivity of the insulation material is relatively small (for example, about 2.5), the capacitive coupling between the current injector electrode 71 and the conductive back plate of the pad 73 can still be quite strong. Therefore the electric impedance between the current injector electrode 71 and the pad back plate (or the tool body 74, because both are connected) can be low. At the same time, current return electrodes 72 are far away from the back plate of the pad 73, so only relatively small portions of the current return electrodes 72 face the pad back plate. Therefore the capacitive coupling between the current return electrodes 72 and the pad back plate can be relatively weak and hence the electrical impedance between the current return electrodes 72 and the pad back plate (or the tool body 74) can be quite high. On the front side of the pad 73, the total length of the current return electrodes 72 (i.e., $L_{ret1}+L_{ret2}$; which can, for example, be about 15 cm) is significantly larger than the length of the current injector electrode 71 (i.e., ($L_{inj\_front}$; which can, for example, be about 2 cm). As such, the capacitance between the current return electrodes 72 and the formation 76 can be substantially larger than the capacitance between the current injector electrode 71 and the formation 76. Therefore the impedance between the current return electrodes 72 and the formation 76 can be substantially smaller than the impedance between the current injector electrode 71 and the formation 76. In this case, the balancing condition may not be met, since on one hand the ratio of the electrical impedance between the current injector electrode 71 and the tool body 74 and the electrical impedance between the current return electrodes 72 and the tool body 74 can be significantly smaller than 1, while on the other hand the ratio of the electrical impedance between the current injector electrode 71 and the formation 76 and the electrical impedance between the current return electrodes 72 and the formation 76 can be significantly larger than 1.

The invention claimed is:

1. An apparatus for making resistivity measurements of an underground formation surrounding a borehole, comprising:
   a conductive tool body;
   a pad having an insulating front face and a back face conductively connected to the tool body, said pad being mounted on the tool body;
   at least one current injector electrode and at least one current return electrode mounted on the front face of the pad so as to be positionable, in use, from a wall of the borehole at a stand-off distance from the wall, the at least one current injector electrode and the at least one current return electrode being electrically isolated from each other;
   wherein a portion of the at least one current return electrode is located between a portion of the current injector electrode and a portion of the back face of the pad so as to decrease the electrical impedance (ZLR) between the tool body and the at least one current return electrode, and increase the electrical impedance (ZLI) between the tool body and the at least one current injector electrode; and the tool body, the pad, the at least one current injector electrode, and the at least one current return electrode are arranged such that:
(a) the ratio of the electrical impedance (ZLI) between the at least one current injector electrode and the tool body and the electrical impedance (ZLR) between the at least one current return electrode and the tool body, and
(b) the ratio of the electrical impedance (ZMI) between the at least one current injector electrode and the formation, and the electrical impedance (ZMR) between the at least one current return electrode and the formation,
differ by 25% or less of the larger of the two impedance ratios (ZLI/ZLR, ZMI/ZMR).

2. The apparatus of claim 1, wherein a potential difference between the tool body and the formation is 25% or less than a potential difference between the at least one current injector electrode and the at least one current return electrode.

3. The apparatus of claim 1, wherein the tool body, the pad, the at least one current injector electrode, and the at least one current return electrode are arranged such that:
(a) the ratio of the electrical impedance (ZLI) between the at least one current injector electrode and the tool body and the electrical impedance (ZLR) between the at least one current return electrode and the tool body, and
(b) the ratio of the electrical impedance (ZMI) between the at least one current injector electrode and the formation, and the electrical impedance (ZMR) between the at least one current return electrode and the formation,
differ by 10% or less of the larger of the two impedance ratios (ZLI/ZLR, ZMI/ZMR).

4. The apparatus of claim 3, wherein a potential difference between the tool body and the formation is 10% or less than a potential difference between the at least one current injector electrode and the at least one current return electrode.

5. The apparatus of claim 1, wherein the tool body, the pad, the at least one current injector electrode, and the at least one current return electrode are arranged such that:
(a) the ratio of the electrical impedance (ZLI) between the at least one current injector electrode and the tool body and the electrical impedance (ZLR) between the at least one current return electrode and the tool body, and
(b) the ratio of the electrical impedance (ZMI) between the at least one current injector electrode and the formation, and the electrical impedance (ZMR) between the at least one current return electrode and the formation,
differ by 1% or less of the larger of the two impedance ratios (ZLI/ZLR, ZMI/ZMR).

6. The apparatus of claim 3, wherein a potential difference between the tool body and the formation is 1% or less than a potential difference between the at least one current injector electrode and the at least one current return electrode.

7. The apparatus of claim 1, wherein the electrical impedance (ZLI) between the at least one current injector electrode and the tool body are arranged to have a predetermined value.

8. The apparatus of claim 1, wherein the electrical impedance (ZLR) between the at least one current return electrode and the tool body are arranged to have a predetermined value.

9. The apparatus of claim 1, wherein the pad is mounted on the tool body by at least one arm providing a conductive path between the back face of the pad and the tool body.

10. The apparatus of claim 1, wherein the pad comprises one current injector electrode located between at least two current return electrodes.

11. The apparatus of claim 1, wherein the at least one current return electrode is configured to wrap around a portion of the at least one current injector electrode.

12. The apparatus of claim 1, wherein the at least one current injector electrode and/or the at least one current return electrode comprise a spatially distributed array of measurement electrodes.

13. The apparatus of claim 1, further comprising an electrical component between the at least one current return electrode or the at least one current injector electrode and the back face of the pad so that there is substantially no potential difference between the tool body and the formation.

14. The apparatus of claim 1, wherein the apparatus is tuneable such that the ratio of the electrical impedance (ZLI) between the at least one current injector electrode and the tool body and the electrical impedance (ZLR) between the at least one current return electrode and the tool body can be adjusted by connecting a variable electrical component to at least one of the tool body, the pad, the at least one current injector electrode, and the at least one current return electrode.

15. The apparatus of claim 14, wherein the variable electrical component is selected from the group consisting of a variable capacitor, a variable inductor, and a variable resistor.

16. The apparatus of claim 1, wherein the ratio of the electrical impedance (ZLI) between the at least one current injector electrode and the tool body and the electrical impedance (ZLR) between the at least one current return electrode and the tool body is determined prior to use of the apparatus based on an estimation of at least one of the electrical impedance (ZMI) between the at least one current injector electrode and the formation, and the electrical impedance (ZMR) between the at least one current return electrode and the formation.

17. The apparatus of claim 16, wherein the estimation comprises estimating the stand-off distance between the at least one current injector electrode and a wall of the borehole, and/or the stand-off distance between the at least one current return electrode and a wall of the borehole.

18. The apparatus of claim 1, wherein the apparatus is adapted to make resistivity measurements at one or more frequencies above 100 kHz or to make resistivity measurements with transient signals having spectral components above 100 kHz.

19. The apparatus of claim 1, further comprising an LWD (logging while drilling)/MWD (measurement while drilling).

20. A method for making resistivity measurements of an underground formation surrounding a borehole using a tool having a pad comprising at least one current injector electrode and at least one current return electrode mounted on a front face of the pad, the at least one current injector electrode and the at least one current return electrode being electrically isolated from each other, the method comprising the steps of:
positioning the pad at a stand-off distance from a wall of the borehole;
estimating at least one of an electrical impedance (ZMI) between the at least one current injector electrode and the formation, and an electrical impedance (ZMR) between the at least one current return electrode and the formation;
determining the ratio of the electrical impedance (ZMI) between the at least one current injector electrode and the formation, and the electrical impedance (ZMR) between the at least one return electrode and the formation;
determining the ratio of an electrical impedance (ZLI) between the at least one current injector electrode and the tool body and the electrical impedance (ZLR)

between the at least one current return electrode and the tool body prior to use, wherein the at least one current injector electrode and the at least one current return electrode are arranged such that the ratio of impedance (ZMI/ZMR) and the ratio of impedance (ZLI/ZLR) differ by 25% or less of the larger of the two impedance ratios;

deploying the apparatus in the borehole; and measuring the resistivity of the underground formation.

* * * * *